United States Patent Office 3,343,165
Patented Sept. 19, 1967

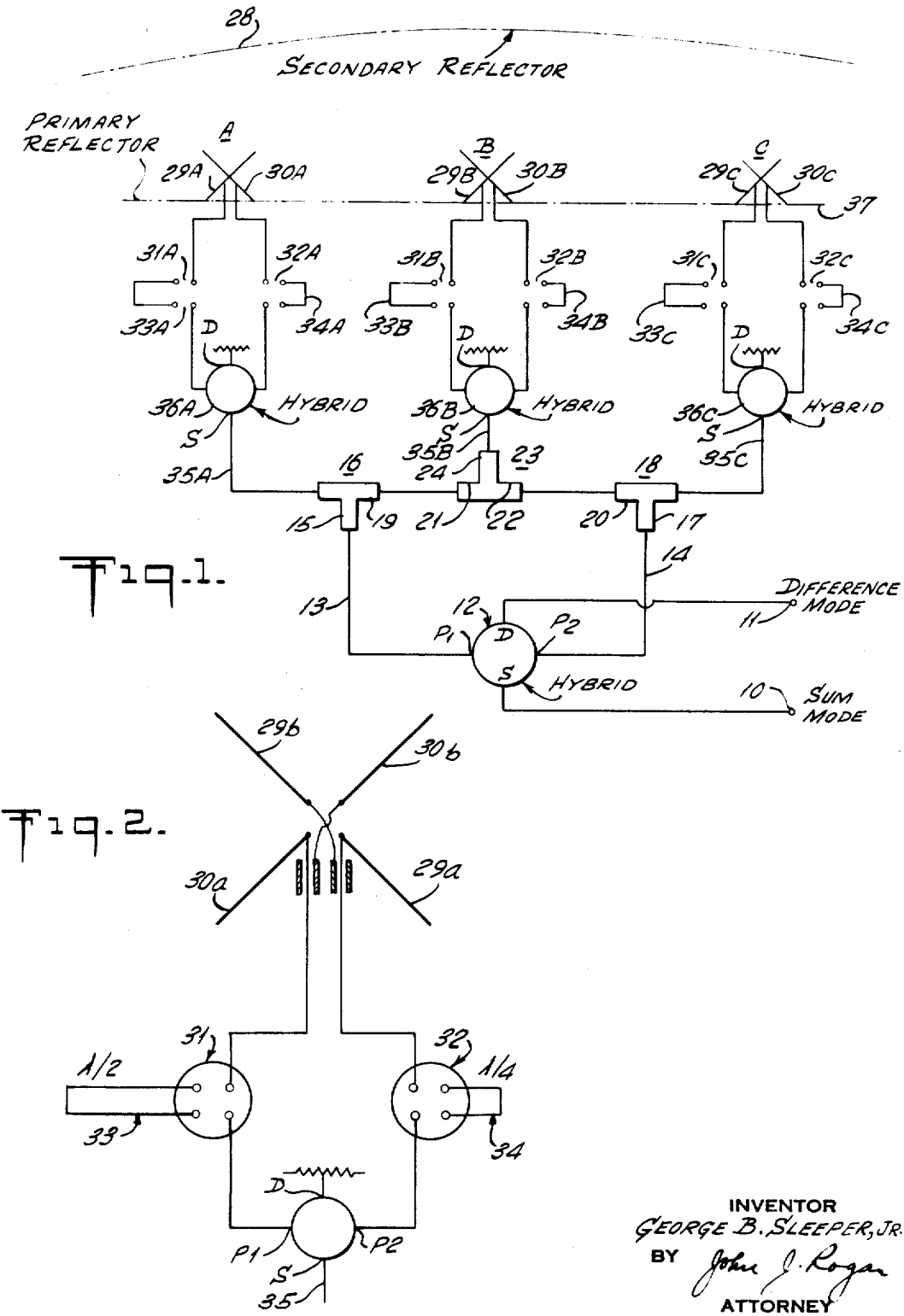

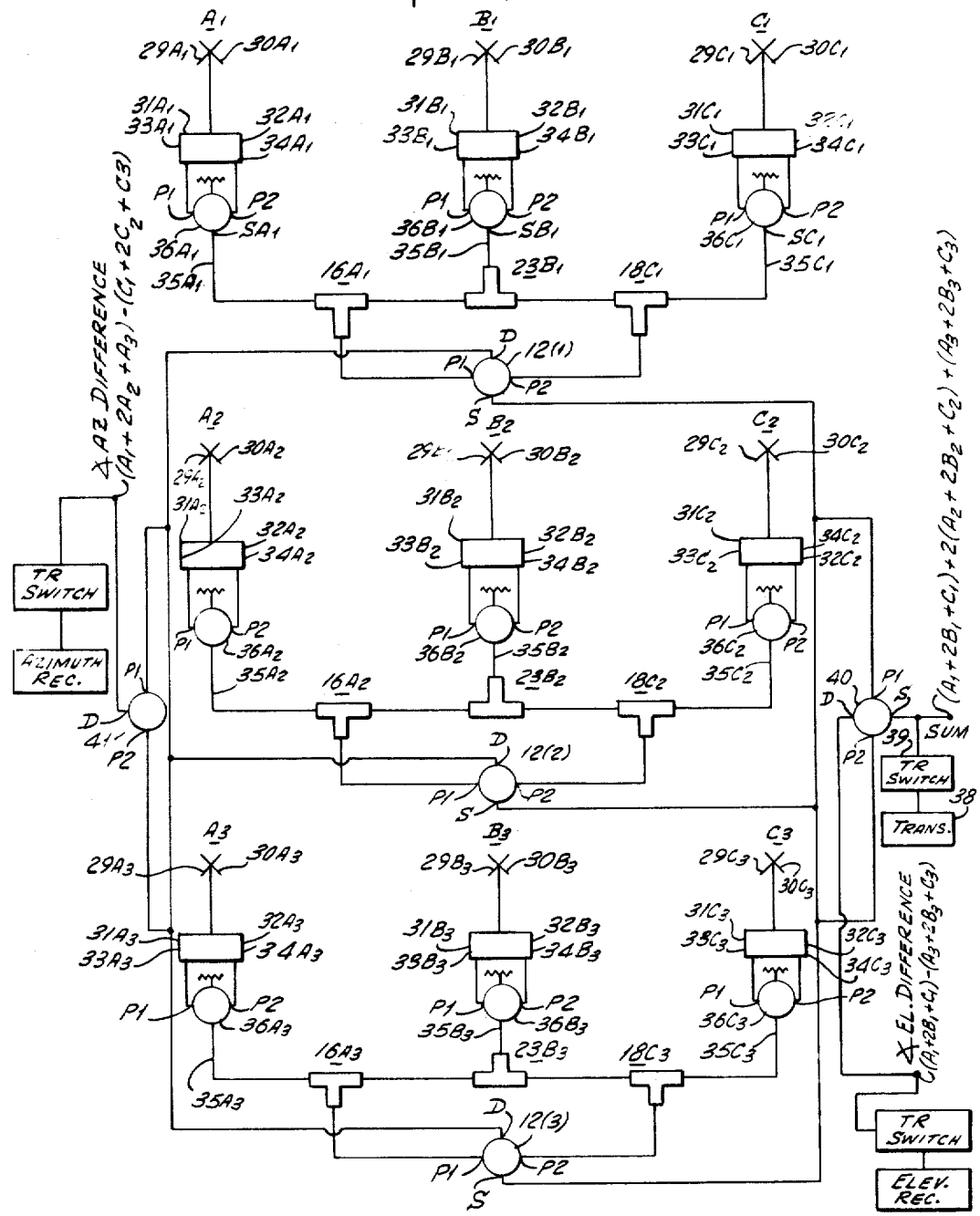

3,343,165
DIRECTIONAL RADIO AND TRACKING SYSTEMS
George B. Sleeper, Jr., Sherburne, N.Y., assignor to Technical Appliance Corporation, Sherburne, N.Y., a corporation of Delaware
Filed July 13, 1965, Ser. No. 471,695
14 Claims. (Cl. 343—16)

ABSTRACT OF THE DISCLOSURE

This invention comprises a directional radio and tracking system. At frequencies where multiple horn monopulse feeds are too large because of aperture blockage, there is provided here a low blockage dipole array feed. The specific embodiments include feed arrays effectively operating for example, as a 3 x 3 binomial array in sum mode and for example, at a 2 x 2 widely spaced array in the difference mode. Semi-independent control of sum and difference mode primary feed apertures are thereby provided.

This invention relates to directional radio systems, and it relates especially to monopulse systems such as employed in radar or automatic antenna tracking systems.

A principal object of the invention is to provide a novel excitational pickup unit for a radiation system whereby directional control can be effected similar to lobe-switching arrangements but without using movable elements for effecting the switching.

Another object is to provide a novel antenna system especially useful for monopulse radar or tracking wherein a beam is radiated for transmission in the sum mode and received or reflected signals can be more effectively used to produce a split or differential result representing the azimuthal angle or elevational angle of a target.

Another object is to provide an improved radar antenna, such for example as is useful in monopulse radar tracking, whereby the limitations ordinarily encountered in horn antennas are greatly reduced.

Another object is to provide an antenna comprising a plurality of radiator elements which can be excited in sum mode with the effect of bringing the radiators electrically close to each other, and can be excited in the difference mode with the effect of relatively widely separating the radiators from each other.

A feature of the invention relates to an improved monopulse radar antenna wherein the so-called aperture blockage effect usually encountered with horn type radiator elements is greatly reduced.

Another feature relates to a radar antenna especially useful in monopulse radar systems, utilizing an array of dipole antenna elements which are located and fed in such a way that they operate as a binomial array in sum mode and in a spaced difference mode, thus enabling at least semi-independent control of the equivalent apertures representing respectively the sum and difference modes.

A further feature relates to an array of dipoles and reflector with feeds thereto whereby the so-called primary feed aperture of the difference mode is approximately twice that for the sum mode, thus reducing the well-known aperture blocking effect which is inherent when using radiators of the horn-cluster kind.

A further feature relates to a novel combination of a dipole array and feed system for energizing the array in sum and difference modes.

A still further feature relates to the novel organization, arrangement, and relative interconnection and location of parts which cooperate to provide an improved monopulse radar antenna system.

Referring to the drawing,

FIG. 1 is a schematic composite structural and wiring diagram explanatory of the invention;

FIG. 2 is a detailed diagram of one of the antenna elements of FIG. 1 showing the transmission line and polarization switches therefor;

FIG. 4 is a complete composite structural and wiring diagram of a system according to the invention embodying a 3 x 3 antenna arrangement;

Figure 3:
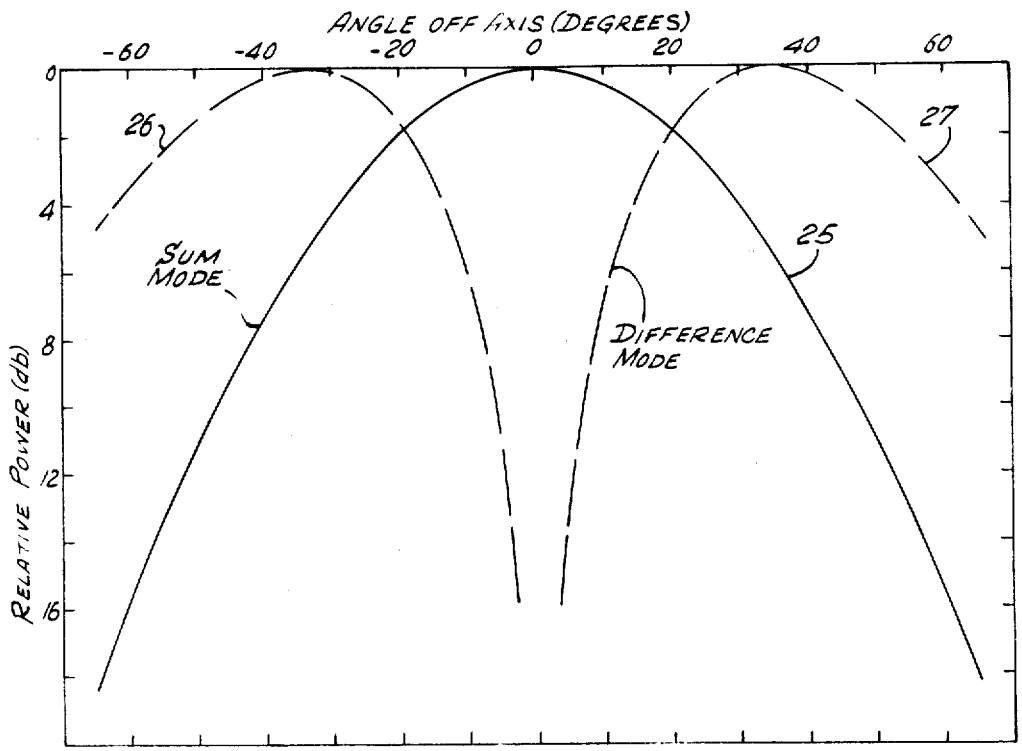
FIG. 3 is a series of graphs showing the characteristic power curves for antenna elements of FIG. 1 when operating in sum mode and difference modes respectively.

As is well known, radar tracking systems are of either the lobe-switching kind or of the monopulse simultaneous kind. In the monopulse system, sequential lobing or conical scanning is replaced by simultaneous lobing wherein the effect of lobe-switching is achieved without using moving antenna elements. This necessitates at least one pair of antenna elements which are so fed that in conjoint operation they produce a single directional beam for transmitting along the so-called bore-sight of the system, and for reception of the reflected signals, the said antenna elements function with angular discrimination and aperture related angularly to the directional error signal. Heretofore the antenna elements for such systems have been in the form of horns or horn-clusters which cooperate with a dish reflector usually of the paraboloid kind. Usually the cluster comprises four horns.

However, it is recognized that for certain applications, especially where the secondary reflectors are not very large, such multiple horn feeds are impracticable because of their large aperture blockage. At frequencies where horn feeds are employed, one proposed solution has been to use a twelve-horn cluster and a special multihorn-multimode feed as described by the author P. W. Hannon in his paper entitled, "Optimum Feeds For All Three Modes of a Monopulse Antenna." (IRE Transactions on Antennas and Propagation, September 1961, pages 444–461.) However, such an arrangement has other undesirable characteristics amongst which is its impracticability where small secondary reflectors or dishes are required.

In accordance with one aspect of the present invention the prior horn cluster is replaced by dipoles or dipole arrays, or log-periodic dipole arrays, and the feed of the dipole elements is such that the primary aperture for such feeds is different for the sum and difference modes, thus providing a more practical independent control of those two modes.

Inasmuch as the invention concerns a radio system which may be either a receiver system or a radar system, and since by the principle of reciprocity the antenna patterns are the same, considered from transmission or reception viewpoints, for the purpose of explanation herein, the so-called mode concept will be used as distinguished from the lobe concept. In other words, reference will be made to the three modes, namely the sum mode, the azimuth difference mode, and the elevation difference mode. It will also be understood that the explanation of the invention in connection with a monopulse tracking system is merely illustrative and that the invention in certain of its aspects is not necessarily limited to that particular kind of system.

In order that the invention may be more clearly understood, a description will first be given in connection with FIG. 1 of the manner of feeding an array of three dipoles so as to achieve the desired independent control of the sum and difference modes. In that figure, the elements A, B, C represent three distinct antenna elements.

In the case of transmission, a signal is applied at the terminal 10 from a suitable transmitter. In the case of reception, such as the signal pulse reflected from a distant target, it appears as a difference signal at terminal 11 which is connected to a suitable receiver. The terminals 10 and 11 are connected respectively to the sum and difference ports S, D, of a hybrid junction or network 12. This junction may be of the well-known magic T type, such for example as disclosed in United States Patent 2,445,895 or Patent 2,593,120. The signal applied at the sum port S will be divided and leave the hybrid junction at lines 13, 14 in phase. Line 13 is connected to the arm 15 of a T transformer 16; likewise line 14 is connected to the arm 17 of a similar T transformer 18. The arms 19, 20 feed the respective arms 21, 22 of another T transformer 23 whose arm 24 feeds the antenna element B. Thus the center T 23 combines the in-phase signals from arms 19 and 20, and the elements A, B, C are driven in 1, 2, 1, or binominal fashion.

On the other hand, the reception of out-of-phase signals from antennas A, C to ports P1, P2 produces a corresponding "difference" signal at port D. These out-of-phase signals when recombined in the T junction 23 by means of arms 19, 20, are still out of phase and therefore element B does not affect the difference signal. Actually in radar systems such for example as in the monopulse system, the three elements A, B, and C are for transmission, excited in the sum mode. The signal reflected from the target excites the two outer elements A and C to a different degree depending upon the deviation of the boresight of the antenna array with respect to the target. Thus the signal picked up by element A emerges from the arm 15 of T 16 and is applied to the port P1 of hybrid 12. Likewise the signal picked up by element C is applied through arm 17 of T 18 and is applied to port P2. By the well-known action of such a hybrid junction, the difference signal appears at the port D. While the reflected signal is also picked up by element B, by reason of the interconnection of T 23 with the T 16 and the T 18, this excitation of element B opposes the signals from elements A and C and is balanced out so that it does not appear at the hybrid 12.

The net result is that the equivalent electric spacing between the radiators A and C has been effectively increased for the difference mode operation relative to the sum mode operation. In other words, the primary feed aperture for the radiators at the difference mode is approximately twice the aperture when operating in the sum mode. This relation is graphically illustrated in FIG. 3 of the drawing wherein the graph 25 represents the relative power (expressed in decibels) radiated when operating in the sum mode and the graphs 26, 27 represent the relative power when operating in the difference mode. In FIG. 3 the ordinates represent the power and the abscissae represent the off-axis relation between the bore-sight of the antenna and the distant target. Thus there is achieved an approximately two-to-one aperture relation between the sum and difference modes, thus enabling optimum illumination of the dish-shaped secondary reflector represented schematically in the drawing by the numeral 28.

While the above described aspect of the invention is not limited to any particular configuration of the elements A, B, C, I have found that improved results are obtained when each of those elements is constituted of a pair of "bent-down" dipoles, one such pair, for example that of element A, being shown in detail in FIG. 2. Thus each of the elements A, B, and C can comprise a pair of bent-down dipoles 29a–29b, and 30a–30b with the apices of the said elements facing and in spaced relation to the secondary reflector 28. The elements A, B, C are mounted in relatively close spacing with respect to the primary reflector 37 (see FIG. 5A), and in relatively widely spaced relation to the dish secondary reflector 28. Such a bent-down dipole has the unique property of nearly identical E-plane and H-plane radiation patterns which are represented approximately by the relation $E(\theta) = E_0 \cos^{0.55}\theta$, wherein $E(\theta)$ is voltage at any angle $\theta$; $\theta$ is off axis angle; $E(0) = E(\theta)$ when $\theta = 0$.

For purposes of switchable multiple polarization of the E and H fields, the bent-down dipoles of each pair are provided with a respective pair of transfer and phasing switches 31, 32. Each switch 31 includes a conventional λ/2 phasing line 33 and each switch 32 includes a conventional λ/4 phasing line 34. Each such pair of bent-down dipoles is connected to its respective feed line 35 through a respective hybrid junction 36. For simplicity in the drawing each bent-down dipole is connected to a respective concentric line but only the center conductor of each such line is shown. Thus the arm 29a is connected to the center conductor of one line, the outer conductor of which is connected to the other arm 29b of the same dipole. Likewise, the arm 30a is connected to the center conductor of the other concentric line whose outer conductor is connected to the other arm 30b of that dipole. The hybrids 12 are used only as power splitters (or power summers) and only the sum ports S are used. The difference ports D are loaded in the conventional manner as indicated schematically by the dissipating resistors connected thereto.

By means of the switches and phasing lines connected to each pair of bent-down dipoles A, B, C the corresponding dipoles of the several pairs can be driven in phase for vertical polarization, or out of phase for horizontal polarization, or in time quadrature for either direction of circular polarization as is well-known in the antenna art. One of the switching and phasing arrangements and its transmission line to one pair of dipoles is shown in FIG. 2. Similar transfer and phasing switch units are employed with each of the elements A, B, C of FIG. 1. The various elements in FIG. 1 similar to those of FIG. 2 bear the same designation numerals with the suffix A, B or C corresponding to the respective antenna elements A, B and C.

Figure 5:
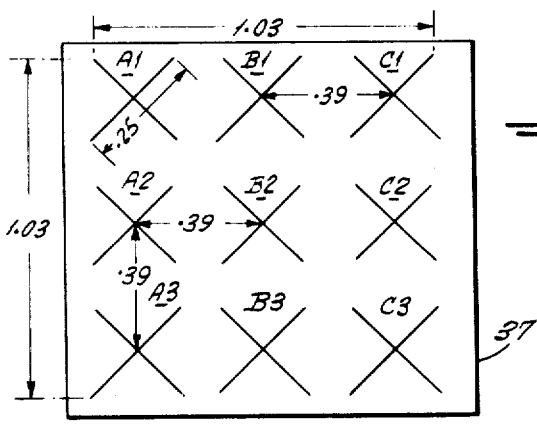
FIG. 5 is a plan view of a 3 x 3 dipole and primary reflector arrangement embodying the features of FIGS. 1 and 2.
Figure 5A:
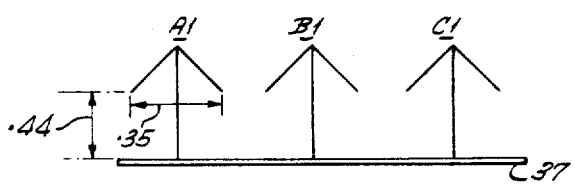
FIG. 5A is a side view of FIG. 5 but also showing the secondary reflector in schematic dot-dash line form.

In one preferred embodiment as shown in FIG. 4, FIG. 5 and FIG. 5A the dish illuminating system or unit comprises an array of nine radiators each similar to the element A of FIG. 2 and arranged in three equally spaced rows with three equally spaced elements in each row. The primary feed radiation patterns of this composite 3 x 3 array are shown in the graphs of FIG. 3. The three elements in each row, for example elements A1, B1, C1 are connected to the appropriate ports P1, P2 of respective hybrids such as hybrid 12 (FIG. 1) whose sum and difference ports S, D are connected to the transmitter through a comparator circuit which is illustrated schematically in FIG. 4. The 3 x 3 array as shown in FIG. 5A is mounted in spaced relation to a primary reflector 37 whose reflected energy illuminates the dish 28. In the well-known manner, the multi-element antenna array is located at or near the focus of reflector 28 so as to effect as uniform illumination as possible of the entire concave surface of reflector 28 from which the secondary radiation is reflected, as indicated in FIG. 5A by the dotted arrows.

Referring to FIG. 4 wherein the primary and secondary reflectors are omitted merely for clarity in the drawing, the parts of that figure which have already been described in connection with FIGS. 1–3 bear the same designation numerals but with appropriate suffixes to represent the corresponding elements associated with the respective rows of radiators A, B, C.

The radar transmitter 38 of any well-known type is connected to the feed and comparator arrangement of FIG. 4 through any well-known transmit-receive switch or TR box 39. As is conventional in monopulse systems, the sum mode is used for transmission. For that purpose the TR box 39 is connected to a hybrid junction 40, such as a magic T, whose conjugate ports P1, P2 are connected to the sum ports S of the respective hybrids 12A, 12B, 12C, similar to the hybrid 12 hereinabove described in connection with FIG. 1. As is well-known with such a hybrid, the signals which leave ports P1, P2 are in like phase. On the other hand, during reception, if out-of-phase signals enter ports P1, P2 the difference signal leaves at port D. Thus as explained hereinabove, the antenna elements A, B, C of each row are driven from the transmitter 38 in binomial fashion in the sum mode represented by $$(A_1+2B_1+C_1)+2(A_2+2B_2+C_2)+(A_3+2B_3+C_3)$$

During reception of the energy reflected from the distant target, and as explained hereinabove, only the elements A and C are effective in transmitting their difference signals to the ports P1, P2 of the respective hybrids 12(1), 12(2) and 12(3), so that only the difference signals appear at the ports P1, P2 of the common hybrid 41. This difference signal $(A_1+2B_1+C_1)-(A_3+2B_3+C_3)$ at port D provides the well-known error voltage corresponding to the azimuth of the target and is applied through a respective transmit-receive switch T–R similar to any well-known azimuth indicating receiver. Similarly the difference signal $(A_1+2A_2+A_3)-(C_1+2C_2+C_3)$ at port D of hybrid 40 provides the error voltage corresponding to the elevation and can be connected through a respective transmit-receive box TR to a suitable azimuth signal indicating receiver.

From the foregoing it will be seen that both the sum and difference mode operations are achieved for both elevation and azimuth planes. While the invention is not limited to any particular frequencies and spacing in dimensions of the various elements, one typical set of spacings is schematically illustrated in FIGS. 5 and 5A from which it will be seen that the 3 x 3 array of nine radiators can be arranged to be about 1.03 wavelengths square and with the spacing between the apices of the respective elements approximately .39 wavelengths. The composite 3 x 3 unit can be mounted approximately .44 wavelength from the primary reflector 37 and approximately at the focus of dish 28. With this particular arbitrary set of dimensions the edge illumination of the secondary reflector dish 28 was 18 db for sum mode, and 4½ db for difference mode. An increase in the spacing between the radiation elements will lower the edge illumination at both modes but with the sum mode dropping off at a faster rate. The exact choice of dimensions depends upon the particular application to which the system is to be used. The net result is that the system provides a feed which affords radiation from the three binomial elements A, B, C in sum mode, and only two widely spaced elements A, C in difference mode and avoids the difficulty of independent control of the two modes such as in the case of a conventional 2 x 2 array of feed horns.

While one particular embodiment of the invention has been described herein, it will be understood that it is done merely for illustrative purposes and not by way of limitation.

Furthermore, while the invention has been explained in connection with a so-called amplitude monopulse method it will be apparent to those familiar with the monopulse art that in certain of its aspects it is also applicable to so-called phase monopulse methods.

What is claimed is:

1. In a directionally sensitive antenna system, the combination of a plurality of physically spaced antenna units, means to excite said units in sum mode to render said units effectively electrically close to each other, and means to excite said units in difference mode to render said units effectively electrically widely spaced from each other whereby the effective apertures in the sum and difference modes may be substantially independently adjusted.

2. In a directionally sensitive antenna system, the combination of three physically spaced antenna elements, means to excite the said elements in sum mode, and means to excite the said elements in difference mode whereby the effective aperture of the array can be substantially independently adjusted for the two modes.

3. In a directionally sensitive antenna system, the combination of three antenna elements, means to excite said elements in sum mode, means to excite said elements in difference mode, the spacing of said elements being such that when so excited they operate as a binomial array in the respective sum and difference modes.

4. In a directionally sensitive antenna system, a set of three dipoles defining by their physical spacing and electrical excitation a predetermined feed aperture, means to excite said elements in sum mode to decrease the equivalent width of said aperture, and means to excite said elements in difference mode to increase the said equivalent aperture whereby the apertures for the sum and difference modes are substantially independently controllable.

5. A directionally sensitive antenna system, comprising an array of three dipoles, means to excite said dipoles in sum mode, and means to excite said dipoles in difference mode whereby the equivalent primary feed aperture of the array for difference mode operation is approximately twice that for the sum mode operation.

6. A directionally sensitive antenna system according to claim 5 in which each of said dipoles is of the bent-down kind, a primary reflector mounted closely adjacent said dipoles on theside remote from the apices of the bends, and a secondary reflector mounted on the opposite side of said dipoles facing said bends to receive the radiation from said primary reflector.

7. A directionally sensitive antenna system according to claim 6 in which said primary reflector is a flat surface, said secondary reflector being dish-shaped, and said dipoles being mounted approximately at the focus of said secondary reflector.

8. A directionally sensitive antenna system according to claim 7 in which each dipole comprises a pair of crossed bent-down dipole elements having normally substantially identical E-plane and H-plane radiation patterns.

9. A directionally sensitive antenna system according to claim 8 in which means are provided for exciting corresponding elements of the several dipoles in phase to produce a vertically polarized pattern.

10. A directionally sensitive antenna system according to claim 8 in which means are provided for exciting corresponding elements of the several dipoles out of phase to produce a horizontally polarized pattern.

11. A directionally sensitive antenna system according to claim 8 in which means are provided for exciting corresponding elements of the several dipoles in phase quadrature to produce a circularly polarized pattern.

12. A directionally sensitive antenna system comprising a plurality of dipoles in three-by-three array with the dipoles equally spaced, the excitation of the dipoles in the first array being A1, B1, C1, the excitation of the dipoles in the second array being A2, B2, C2, and the excitation of the dipoles in third array being A3, B3, C3, and means to excite all said dipoles to produce a resultant field of pattern in sum mode equal to $$(A_1+2B_1+C_1)+2(A_2+2B_2+C_2)+(A_3+2B_3+C_3)$$

and a composite field pattern in difference mode equal to $(A_1+2B_1+C_1)-(A_3+2B_3+C_3)$.

13. A directionally sensitive radiation system especially suited for radar tracking and the like, comprising in combination, a set of three spaced antenna elements, comprising two outer elements and a middle element, a magic T for each element, a hybrid network having a difference port, a sum port and two input ports, means interconnecting the middle magic T with the two outer magic T's in like phase to the input ports of said hybrid network, and means interconnecting the middle magic T to the outer magic T's so that the middle T combines the in phase excitation of the middle dipole with that of the two outer dipoles whereby the three dipoles are excited in one-two-one binomial fashion.

14. A directionally sensitive radiation system according to claim 13 in which the antenna elements are arranged in a three-by-three array, means to excite the entire array in sum mode to produce a composite field pattern represented by $$(A_1+2B_1+C_1)+2(A_2+2B_2+C_2)+(A_3+2B_3+C_3)$$

and means to excite the entire array in difference mode to produce a difference field pattern represented by $(A_1+2B_1+C_1)-(A_3+2B_3+C_3)$.

References Cited

UNITED STATES PATENTS

| 2,717,380 | 9/1955 | Brooks | 343—113 |
| 3,170,135 | 2/1965 | Yagelowich | 343—113 X |
| 3,267,472 | 8/1966 | Fink | 343—100 |

RODNEY D. BENNETT, *Primary Examiner.*

CHESTER L. JUSTUS, *Examiner.*

J. P. MORRIS, *Assistant Examiner.*